(12) United States Patent
Shieh (10) Patent No.: US 9,529,995 B2
(45) Date of Patent: Dec. 27, 2016

(54) AUTO DISCOVERY OF VIRTUAL MACHINES

(75) Inventor: Choung-Yaw Michael Shieh, Palo Alto, CA (US)

(73) Assignee: VARMOUR NETWORKS, INC., Santa Clara, CA (US)

( * ) Notice: Subject to any disclaimer, the term of this patent is extended or adjusted under 35 U.S.C. 154(b) by 0 days.

(21) Appl. No.: 13/291,739

(22) Filed: Nov. 8, 2011

(65) Prior Publication Data

US 2013/0117836 A1     May 9, 2013

(51) Int. Cl.
| | | |
|---|---|---|
| G06F 15/16 | (2006.01) | |
| G06F 21/53 | (2013.01) | |
| H04L 12/24 | (2006.01) | |
| G06F 9/455 | (2006.01) | |

(52) U.S. Cl.
CPC ........... *G06F 21/53* (2013.01); *G06F 9/45558* (2013.01); *H04L 41/12* (2013.01); *G06F 2009/45575* (2013.01); *G06F 2009/45587* (2013.01)

(58) Field of Classification Search
CPC .. H04L 43/04; H04L 61/2015; H04L 63/1408; H04L 63/20
See application file for complete search history.

(56) References Cited

U.S. PATENT DOCUMENTS

| | | |
|---|---|---|
| 6,765,864 B1 | 7/2004 | Natarajan et al. |
| 6,992,985 B1 * | 1/2006 | Das ................................ 370/252 |
| 7,058,712 B1 | 6/2006 | Vasko |
| 7,062,566 B2 | 6/2006 | Amara |
| 7,068,598 B1 | 6/2006 | Bryson et al. |
| 7,774,837 B2 | 8/2010 | McAlister |
| 7,849,495 B1 | 12/2010 | Huang |
| 7,949,677 B2 | 5/2011 | Croft et al. |
| 7,954,150 B2 | 5/2011 | Croft et al. |
| 8,274,912 B2 * | 9/2012 | Wray et al. .................... 370/254 |
| 8,321,862 B2 | 11/2012 | Swamy et al. |
| 2003/0177389 A1 | 9/2003 | Albert et al. |

(Continued)

FOREIGN PATENT DOCUMENTS

WO     WO 2011/012165     2/2011

OTHER PUBLICATIONS

U.S. Appl. No. 13/288,872, Notice of Allowance and Fee(s) Due, Dated Apr. 11, 2014, 19 pages.

(Continued)

*Primary Examiner* — Farid Homayounmehr
*Assistant Examiner* — Christopher C Harris
(74) *Attorney, Agent, or Firm* — Blakely, Sokoloff, Taylor & Zafman LLP (57) ABSTRACT

A method and apparatus is disclosed herein for performing auto discovery of virtual machines. In one embodiment, the method includes monitoring, using an interface of the device, one or more packets being sent from one or more virtual machines, the one or more packets being sent determining, using a processor of the device, if one of the monitored packets includes a discovery packet from one virtual machine of the one or more virtual machines, wherein the discovery packet includes an address of a destination location; sending, using the interface of the device, a reply packet to the one virtual machine using an address in the discovery packet identified in the monitored packets, the reply packet including an Internet Protocol (IP) address of the device.

17 Claims, 5 Drawing Sheets

(56) References Cited

U.S. PATENT DOCUMENTS

| | | | |
|---|---|---|---|
| 2004/0095897 A1* | 5/2004 | Vafaei | 370/254 |
| 2007/0079308 A1* | 4/2007 | Chiaramonte et al. | 718/1 |
| 2007/0271612 A1 | 11/2007 | Fang et al. | |
| 2008/0083011 A1 | 4/2008 | McAlister et al. | |
| 2008/0155239 A1 | 6/2008 | Chowdhury et al. | |
| 2008/0301770 A1 | 12/2008 | Kinder | |
| 2009/0249472 A1* | 10/2009 | Litvin | H04L 63/0263 726/14 |
| 2010/0043068 A1 | 2/2010 | Varadhan et al. | |
| 2010/0095367 A1 | 4/2010 | Narayanaswamy | |
| 2010/0228962 A1 | 9/2010 | Simon et al. | |
| 2010/0235880 A1 | 9/2010 | Chen | |
| 2011/0003580 A1 | 1/2011 | Belrose et al. | |
| 2011/0069710 A1* | 3/2011 | Naven et al. | 370/395.3 |
| 2011/0138384 A1 | 6/2011 | Bozek et al. | |
| 2011/0225624 A1 | 9/2011 | Sawhney et al. | |
| 2011/0263238 A1 | 10/2011 | Riley et al. | |
| 2012/0017258 A1 | 1/2012 | Suzuki | |
| 2012/0131685 A1 | 5/2012 | Broch et al. | |
| 2012/0216273 A1* | 8/2012 | Rolette | G06F 21/577 726/13 |
| 2012/0311144 A1 | 12/2012 | Akelbein et al. | |
| 2012/0311575 A1 | 12/2012 | Song | |
| 2013/0086399 A1 | 4/2013 | Tychon et al. | |
| 2013/0097692 A1* | 4/2013 | Cooper et al. | 726/14 |
| 2015/0281274 A1* | 10/2015 | Masurekar | H04L 63/1466 726/22 |
| 2015/0281347 A1* | 10/2015 | Wang | G06F 9/5027 709/203 |

OTHER PUBLICATIONS

U.S. Appl. No. 13/285,814, Office Action, Mar. 26, 2014, 26 pages.
U.S. Appl. No. 13/288,872, Office Action, Dated Jun. 24, 2013, 10 pages.
U.S. Appl. No. 13/288,872, Office Action, Dated Jan. 22, 2013, 9 pages.
U.S. Appl. No. 13/363,088, Office Action, Dated Feb. 13, 2013, 6 pages.
U.S. Appl. No. 13/363,088, Notice of Allowance and Fee(s) Due, Dated Aug. 16, 2013, 12 pages.
U.S. Appl. No. 13/285,814, Office Action, Dec. 11, 2012, 21 pages.
U.S. Appl. No. 13/285,814, Office Action, Aug. 20, 2013, 23 pages.
U.S. Appl. No. 13/363,082, Office Action, Nov. 19, 2014, 9 pages.
U.S. Appl. No. 13/363,082, Apr. 30, 2015, 16 pages.
U.S. Appl. No. 13/363,082, Notice of Allowance, Aug. 12, 2015, 11 pages.

* cited by examiner

AUTO DISCOVERY OF VIRTUAL MACHINES

FIELD OF THE INVENTION

Embodiments of the present invention are related to the field of network security; more particularly, embodiments of the present invention are related to the field of discovery of virtual machines by network security devices.

BACKGROUND OF THE INVENTION

IT industry is undergoing a revolution in the area of virtualization for the benefit of low-cost and flexibility. A typical network deployment scenario has a security gateway deployed at the edge of the network to protect virtual machines that run on servers. Each of these virtual machines may have one or more connections with other devices in the network.

However, as the security gateway is deployed at the perimeter of the data center, it has no knowledge of when a new virtual machine is created. If the virtual machine moves to a different host with a different IP address, the security gateway does not know that such a move occurred. Thus, the security gateway is not able to forward the packets of on-going connections to the correct virtual machine.

SUMMARY OF THE INVENTION

A method and apparatus is disclosed herein for performing auto discovery of virtual machines. In one embodiment, the method comprises monitoring, using an interface of the device, one or more packets being sent from one or more virtual machines, the one or more packets being sent determining, using a processor of the device, if one of the monitored packets comprises a discovery packet from one virtual machine of the one or more virtual machines, wherein the discovery packet includes an address of a destination location; sending, using the interface of the device, a reply packet to the one virtual machine using an address in the discovery packet identified in the monitored packets, the reply packet including an Internet Protocol (IP) address of the device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Embodiments of the present invention allow a security gateway to discover the virtual machines it protects without requiring configuration of the IP address of the security gateway or virtual machine. When a virtual machine boots up or its IP address is changed, the virtual machine starts sending discovery packets to a location on the network (i.e., the Internet), which could be represented as, for example, an IP address or host name, such as www.a_company.com. When the discovery packets pass through a security gateway, the security gateway monitors the traffic, intercepts the discovery packet, obtains the address (e.g., IP address) of the virtual machine from the packet, and replies to the virtual machine with its own address (e.g., IP address). That is, the reply to the virtual machine includes its own IP address in the content of the packet. Once the virtual machine receives the packet, the virtual machine is able to communicate with the security gateway directly. Now the security gateway can manage and communicate with the virtual machines under its security policy. Thus, the discovery transaction allows the security gateway and virtual machine learn each other's IP address. Once the discovery transaction is done, the security gateway or the virtual machine can initiate a direct connection for authentication and future operation and interaction.

Advantages of embodiments of the present invention include, without limitation, providing flexibility in deploying virtual machines to be identified by the security gateway. In typical network deployment scenario, the virtual machines are cloned from a virtual machine template. Deploying virtual machines without additional configuration of the security gateway provides an easy way for management and provisioning. This allows virtual machines to move around to different hosts for load balancing without having to worry about the security gateway configuration.

Thus, embodiments of the present invention enable virtual machine management with no configuration of the security gateway. As the security gateway can automatically discover and identify the virtual machines, the security gateway can automate the virtual machines management behind the security gateway.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Figure 1:
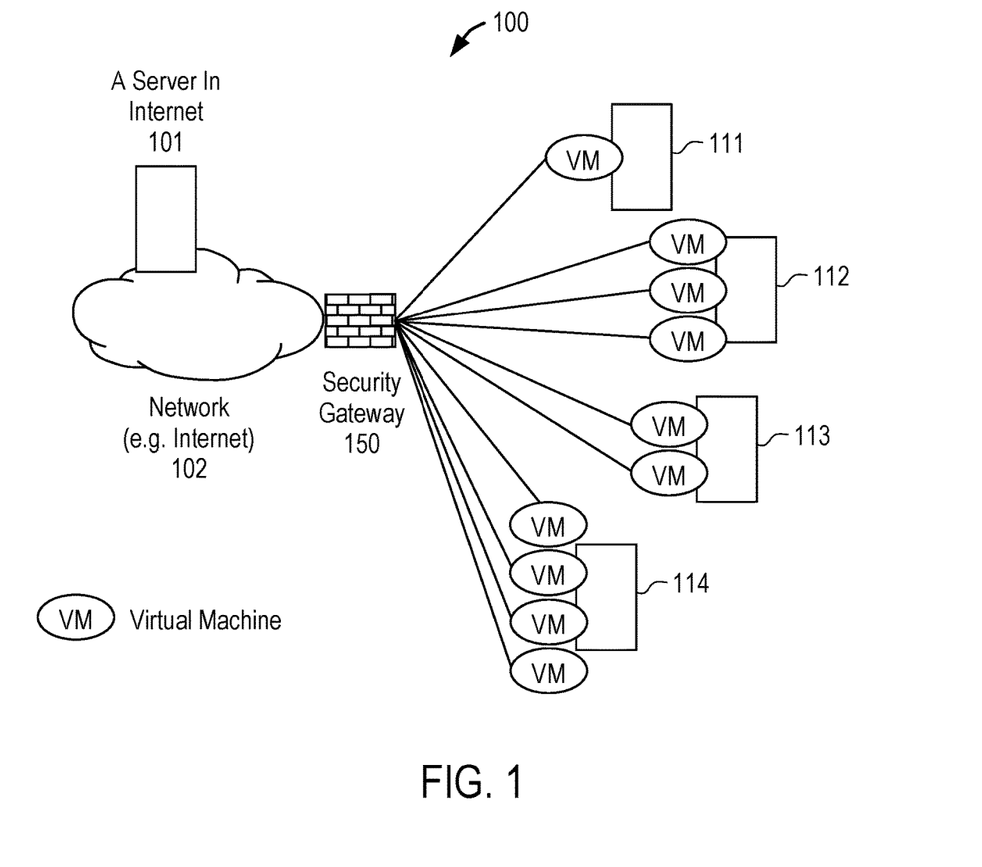
FIG. 1 is a block diagram of a network architecture containing a security gateway and a number of protected virtual machines.

FIG. 1 is a block diagram of a network architecture 100 containing a security gateway 150 and a number of protected virtual machines (VMs) running on servers 111-114. In one embodiment, each VM has a VM identifier (ID) that enables security gateway 150 to identify each VM. Network architecture 100 also includes a network 102 (e.g., the Internet) communicably coupled to security gateway 150 in a manner well-known in the art. One or more other devices, such as for example, server 101 are coupled to network 102. Any of these devices can be implemented with a computer system. Note that network architecture 100 may include more or less than one device such as server 101 coupled to network 102, as well as more than one security gateway 150. Similarly, network architecture 100 may include more or less than four servers 111-114 coupled to security gateway 150, with a varying number of VMs different than those shown in FIG. 1.

In a typical network deployment, VMs are created dynamically, and acquire IP address dynamically from DHCP servers. In one embodiment, when a VM boots up or its IP address is changed, the VM starts sending discovery packets to a location in the network (e.g., the Internet). In one embodiment, the location is a fully qualified domain name, such as www.a_company.com. In another embodiment, the location is an IP address that belongs to a host on the network. In yet another embodiment, the location is a broadcast address.

In one embodiment, security gateway 150 is located at the perimeter of the networks and is responsible for forwarding packets to other networks, including the Internet. When a VM on one of servers 111-114 sends out discovery packets to a location in network 102, the packets reach security gateway 150. Security gateway 150 intercepts the packets and replies to them as if it's from the destination address of the original packet. The reply packet includes the IP address of security gateway 150 embedded in the payload. After the VM receives the reply packet, both security gateway 150 and the VM know each other's address. As both parties know each other's IP address, security gateway 150 or the virtual machine then initiates another connection to the peer for mutual authentication between security gateway 150 and the VM. Once the two parties authenticate each other, security gateway 150 can apply its security policy to the VM.

Security gateway 150 could be other types of network device, such as a router or switch, as long as it sits on the path to the network 102 (e.g., the Internet) from the virtual machines. As long as these network devices can monitor and intercept the discovery packets, then they could apply the techniques described herein.

The discovery packet could be part of the well-known network protocol, such as, for example, DNS query or HTTP request, or it could be a custom protocol that agreed between the security gateway and the virtual machine. The network protocol could be TCP, UDP, or others.

Figure 2:
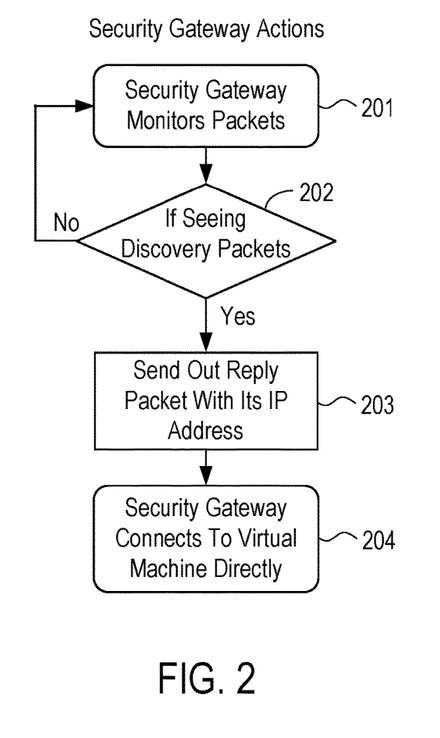
FIG. 2 is a dataflow diagram of one embodiment of a process for performing discovery in a network environment.

FIG. 2 is a dataflow diagram of one embodiment of a process for performing discovery in a network environment. The process is performed by processing logic that may comprise hardware (circuitry, dedicated logic, etc.), software (such as is run on a general purpose computer system or a dedicated machine), or a combination of both. In one embodiment, the processing logic is part of a security gateway in a network.

Referring to FIG. 2, the process begins by processing logic monitoring packets that are sent from one or more virtual machines (processing block 201). In response to monitoring such packets, processing logic determines whether such packets include a discovery packet from one of the virtual machines (processing block 202). If not, the process transitions to processing block 201 and the process repeats. If a discovery packet from a virtual machine is contained in the monitored packets, processing logic intercepts the packet and sends out a reply packet to that virtual machine with its IP address (processing block 203). Note that in another embodiment, an address other than an IP address is provided as long as the virtual machine is able to contact the security gateway using the provided address.

Thereafter, processing logic in the security gateway directly connects to the virtual machine (processing block 204). In one embodiment, the direct connection may be the result of the security gateway sending one or more packets directly to the virtual machine using its address. In another embodiment, the direct connection may be the result of the virtual machine sending one or more packets directly to the security gateway using its address.

Note that the auto discovery technique described herein could apply to physical servers as well. Also, the security gateway can use the same procedure to discover the physical servers, as long as they are protected by the security gateway.

The destination location of the discovery packet could be specified in various formats. In one embodiment, the destination location is a fully quality domain name. In another embodiment, the destination location is an IP address. In yet another embodiment, the destination location is a broadcast address. Regardless of the format chosen, in one embodiment, the destination location is only limited to being on the path to the security gateway from the virtual machine.

Figure 3:
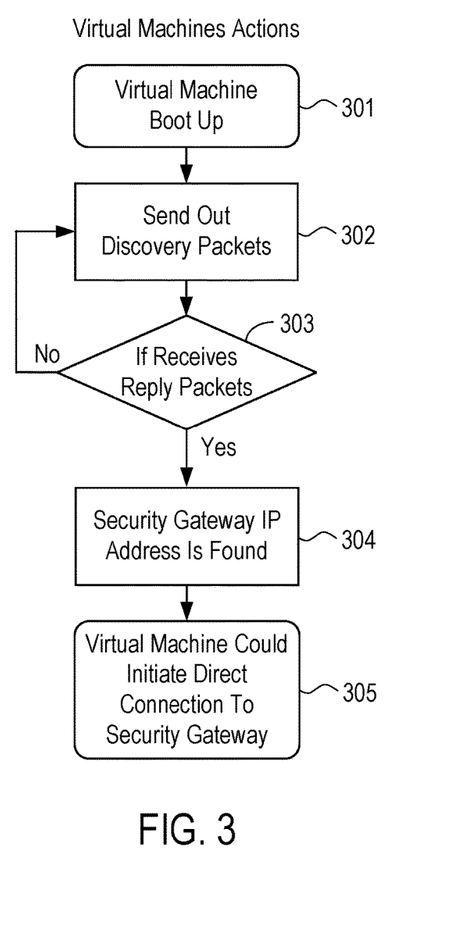
FIG. 3 is a dataflow diagram of one embodiment of a process performed by a virtual machine as part of the discovery process.

FIG. 3 is a dataflow diagram of one embodiment of a process performed by a virtual machine as part of the discovery process. The process is performed by processing logic that may comprise hardware (circuitry, dedicated logic, etc.), software (such as is run on a general purpose computer system or a dedicated machine), or a combination of both.

Referring to FIG. 3, the process begins by processing logic booting up the virtual machine (processing block 301). The virtual machine boot up process occurs in a manner well-known in the art.

After boot up, processing logic in the virtual machine sends out one or more discovery packets (processing block 302). In one embodiment, the processing logic sends out one discovery packet and then waits for a reply. The processing logic sends out another discovery packet if it times out in waiting for reply (i.e., a predetermined time passes without receiving a reply). In an alternative embodiment, one could utilize multiple discovery and reply packets. As set forth above, each discovery packet includes a destination location, which may comprise a fully quality domain name, an IP address on the Internet, a broadcast address, etc.

After sending the discovery packet(s), processing logic tests whether the virtual machine has received a reply packet (processing block 303). If not, the process transitions to processing block 302 and the process repeats itself. If processing logic receives a reply packet, the process transitions to processing block 304 where processing logic determines the IP address (or other address) of the security gateway.

Using the address of the security gateway, processing logic initiates a direct connection to the security gateway (processing block 305). Alternatively, the security gateway may initiate a direct connection to the virtual machine using the virtual machine's address provided in the discovery packet.

An Example of a Network Device

In one embodiment, the security gateway or other network device performing the discovery packet transaction with the VMs includes a memory, a second interface to receive one or more packets from the one or more virtual machines, and a processor. In one embodiment, the processor is operable to determine if one of packets being received on the interface comprises a discovery packet from one virtual machine of the one or more virtual machines, where the discovery packet includes an address of a destination location in the network, and generate a reply packet to the one virtual machine using an address in the discovery packet identified in the monitored packets, where the reply packet includes an Internet Protocol (IP) address of the security gateway (or device). The processor causes the reply packet to be sent through the interface to the one virtual machine.

Figure 4:
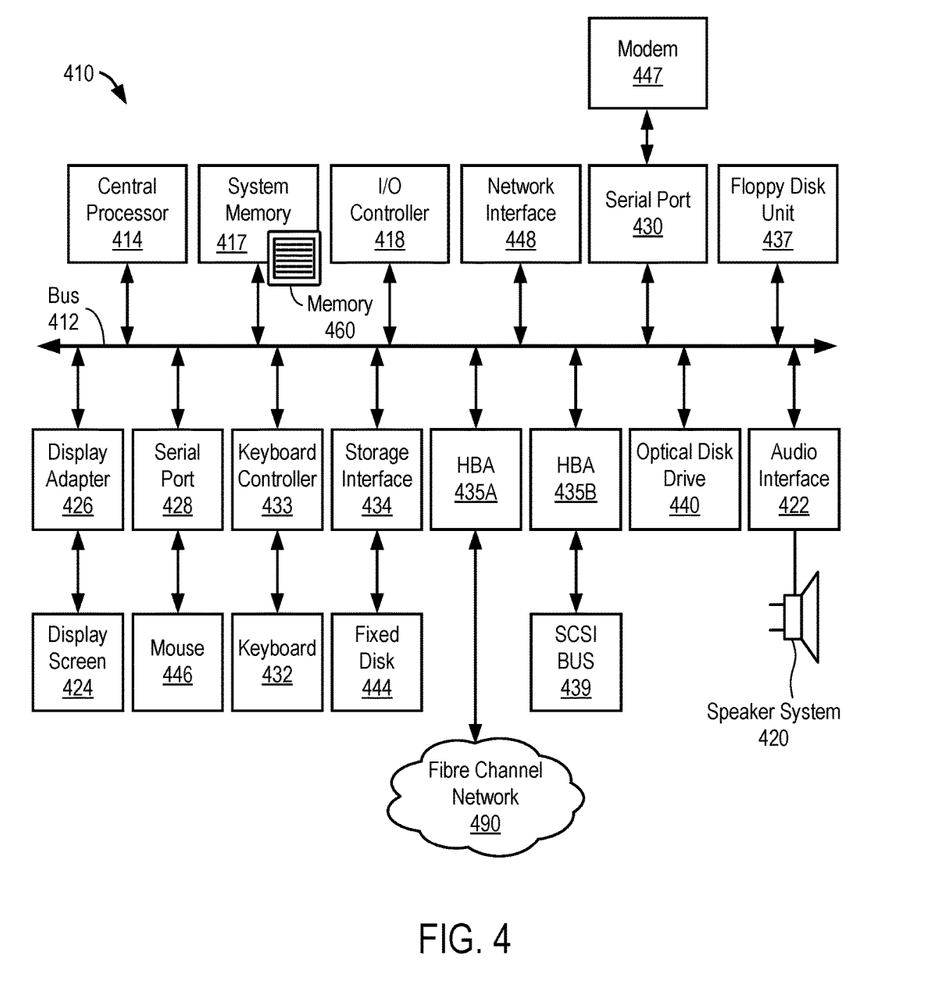
FIG. 4 depicts a block diagram of one embodiment of a security gateway.

FIG. 4 depicts a block diagram of a security gateway, such as security gateway 150 of FIG. 1. Referring to FIG. 4, security gateway 410 includes a bus 412 to interconnect subsystems of security gateway 410, such as a processor 414, a system memory 417 (e.g., RAM, ROM, etc.), an input/output controller 418, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a Fibre Channel network 490, a host bus adapter (HBA) interface card 435B operative to connect to a SCSI bus 439, and an optical disk drive 440. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417. System memory 417 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), a floppy disk unit 437, or other storage medium.

Storage interface 434, as with the other storage interfaces of computer system 410, can connect to a standard computer readable medium for storage and/or retrieval of information, such as a fixed disk drive 444. Fixed disk drive 444 may be a part of computer system 410 or may be separate and accessed through other interface systems.

Modem 447 may provide a direct connection to a remote server via a telephone link or to the Internet via an internet service provider (ISP) (e.g., servers 101, 111-114 of FIG. 1). Network interface 448 may provide a direct connection to a remote server such as, for example, servers 111-114 of FIG. 1. Network interface 448 may provide a direct connection to a remote server (e.g., server 101 of FIG. 1) via a direct network link to the Internet via a POP (point of presence). Network interface 448 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 4 need not be present to practice the techniques described herein. The devices and subsystems can be interconnected in different ways from that shown in FIG. 4. The operation of a computer system such as that shown in FIG. 4 is readily known in the art and is not discussed in detail in this application.

Code to implement the security gateway operations described herein can be stored in computer-readable storage media such as one or more of system memory 417, fixed disk 444, optical disk 442, or floppy disk 438. The operating system provided on computer system 410 may be MS-DOS®, MS-WINDOWS®, OS/2®, UNIX®, Linux®, or another known operating system.

Figure 5:
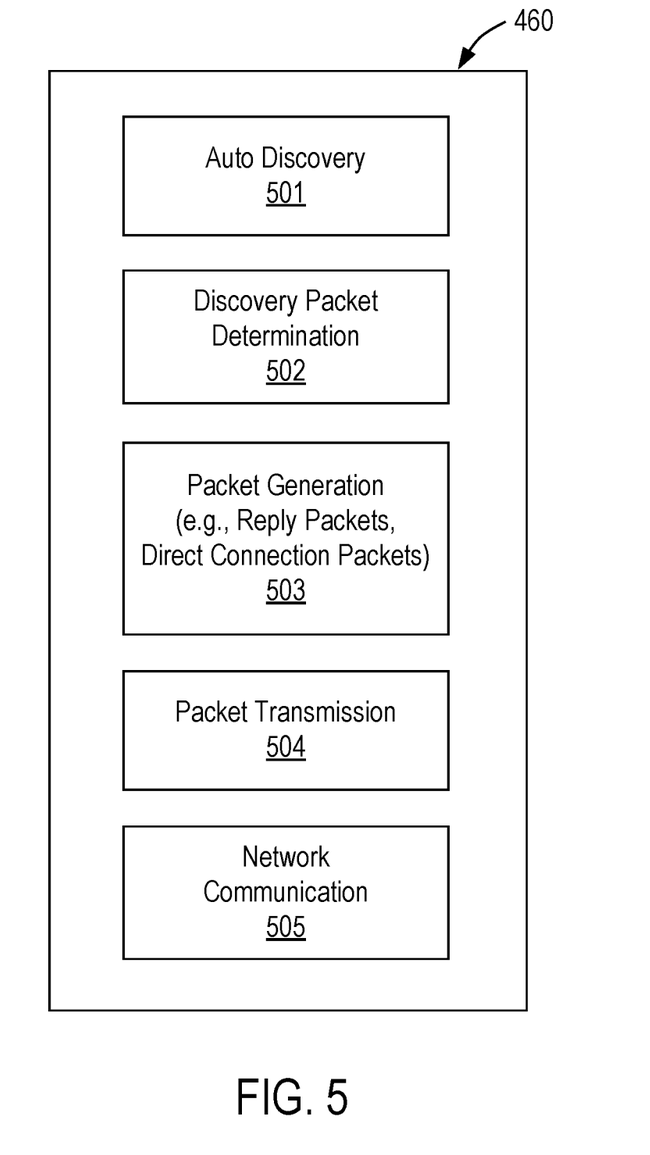
FIG. 5 illustrates a set of programs and data that is stored in memory of one embodiment of a security gateway.

FIG. 5 illustrates a set of code (e.g., programs) and data that is stored in memory of one embodiment of a security gateway, such as the security gateway set forth in FIG. 4. The security gateway uses the code, in conjunction with a processor, to implement the necessary operations (e.g., logic operations) to implement the described herein.

Referring to FIG. 5, the memory 460 includes a monitoring module 501 which when executed by a processor is responsible for performing traffic monitoring of traffic from the VMs as described above. The memory also stores a discovery packet determination module 502 which, when executed by a processor, is responsible for determining if a discovery packet is contained in the monitored packets and a packet generation module 503 which, when executed by a processor, is responsible for generating packets such as the reply packet sent in response to a discovery packet and a packet from connection packet sent by the VM after the reply packet is sent. Memory 460 also stores packet transmission module 504, which when executed by a processor causes a packet, such as, for example, the reply packet, to be sent to a VM using, for example, network communications. The memory also includes a network communication module 505 used for performing network communication and communication with the other devices (e.g., servers, clients, etc.).

Figure 6:
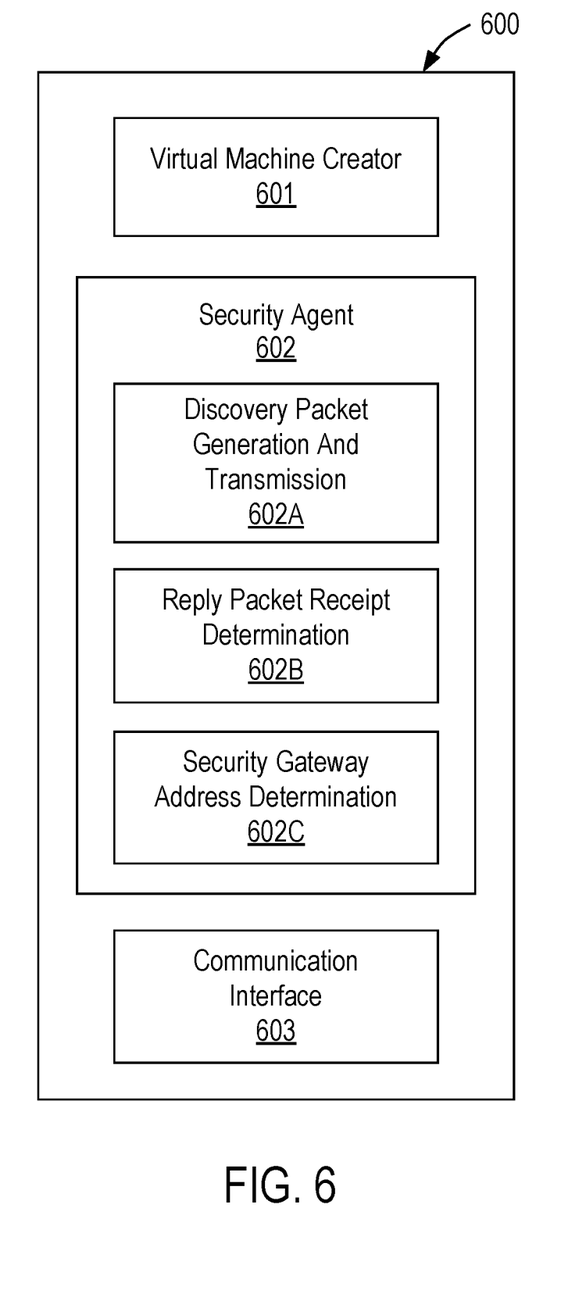
FIG. 6 illustrates a set of programs and data that is stored in memory of one embodiment of a server.

As described above, the servers in FIG. 1, such as servers 111-114 or server 101, may be implemented using a computer system. In one embodiment, one or more of the servers 111-114 is implemented using a system such as depicted in FIG. 4 as well, except using different code to implement the techniques and operations performed by such servers and their VMs as described above. The code is stored in computer-readable storage medium such as system memory 417, fixed disk 444, optical disk 442 or floppy disk 448. FIG. 6 illustrates a set of code (e.g., programs) and data that is stored in one of those memories. In one embodiment of the server, such as implemented using the system shown in FIG. 4. The server uses the code, in conjunction with the processor, to implement the necessary operations to implement the discovery process depicted above, such as, for example, the operation set forth in FIG. 3.

Referring to FIG. 6, the memory 600 includes virtual machine creation module 601 which when executed by a processor is responsible for creating a virtual machine on the server in a manner well-known in the art. Memory 600 also includes software agent 602 which is run by a virtual machine after it has been created. Software agent 602 includes discovery packet generation and transmission module 602A that is responsible for generating a discovery packet to be directed to the network as described above. Software agent module 602 also includes reply packet receipt determination module 602B which when executed by a processor is responsible for determining whether a reply packet, responsive to the discovery packet that has been previously sent by the VM, has been received by the server, and in particular the software agent. Software agent module 602 also includes security gateway address determination module 602C which when executed by a processor is responsible for obtaining the security gateway address from a received reply packet. Memory 600 also includes communication interface module 603 used for performing communication with other devices (e.g., security gateway, servers, clients, etc.).

In an alternative embodiment, each of servers 111-114 includes a hypervisor that is responsible for connection to the security gateway.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method performed by a device in a network, the device located between the network and one or more systems, at least one of the one or more systems having one or more virtual machines running thereon, the method performed by comprising:

monitoring, using an interface of the device, one or more packets being sent from the one or more virtual machines and a newly deployed virtual machine running on one of the one or more systems, wherein the newly deployed virtual machine provides an internet protocol (IP) address in a discovery packet, and wherein the newly deployed virtual machine comprises one of a dynamically created virtual machine that has acquired a dynamically created IP address or an existing virtual machine with a changed IP address;

in response to detection by the device of the newly deployed virtual machine based on receipt of a discovery packet sent by the newly deployed virtual machine in the one or more packets being monitored and the IP address in the discovery packet, intercepting the discovery packet at the device, wherein the discovery packet is sent from the newly deployed virtual machine to an address of a destination location on the network different from an address of the device;

determining, using a processor of the device, from the intercepted discovery packet from the newly deployed virtual machine, the address of the destination location and the IP address of the newly deployed virtual machine that sent the discovery packet; and sending, using the interface of the device, a reply packet to the newly deployed virtual machine, the reply packet generated by the device in response to the discovery packet using the IP address of the newly deployed virtual machine in the discovery packet identified in the intercepted discovery packet, the reply packet including an IP address of the device that enables communication between the newly deployed virtual machine and the destination location through the device, wherein a connection is initiated with the newly deployed virtual machine based on the reply packet.

2. The method defined in claim 1 wherein the device comprises a security gateway.

3. The method defined in claim 1 wherein the discovery packet is a DNS query or an HTTP request.

4. The method defined in claim 1, wherein initiation of the connection further comprises:

subsequent to sending the reply packet, initiating a direct connection with the newly created virtual machine.

5. The method defined in claim 1, wherein initiation of the connection further comprises:

subsequent to sending the reply packet, receiving a packet from the newly created virtual machine to initiate a direct connection with the device and the newly created virtual machine.

6. The method defined in claim 1 wherein the destination address is for a location on the Internet, a domain name, or a broadcast address.

7. A security gateway for using a network, the security gateway to be located between the network and one or more systems, at least one of the one or more systems having one or more virtual machines running thereon, the security gateway comprising:

a memory;

an interface to receive one or more packets from the one or more virtual machines; and a processor coupled to the memory and the interface and operable to in response to detection of a newly deployed virtual machine based on receipt of a discovery packet sent by the newly deployed virtual machine in the one or more packets being received and an internet protocol (IP) address in the discovery packet, intercept the one or more packets, wherein the newly deployed virtual machine runs on one of the one or more systems and comprises one of a dynamically created virtual machine that has acquired a dynamically created IP address or an existing virtual machine with a changed IP address, and wherein the discovery packet is sent from the newly deployed virtual machine to an address of a destination location on the network different from an address of the security gateway;

determine from the intercepted discovery packet from the newly deployed virtual machine, the address of the destination location in the network and the IP address of the newly deployed virtual machine that sent the discovery packet;

generate a reply packet to the newly deployed virtual machine, the reply packet generated by the security gateway in response to the discovery packet using the IP address of the newly deployed virtual machine in the discovery packet identified in the intercepted discovery packet, the reply packet including an IP address of the security gateway that enables communication between the newly deployed virtual machine and the destination location through the security gateway, wherein the processor causes the reply packet to be sent through the interface to the newly deployed virtual machine, wherein a connection is initiated with the newly deployed virtual machine based on the reply packet.

8. The security gateway defined in claim 7 wherein the discovery packet is a DNS query or an HTTP request.

9. The security gateway defined in claim 7 wherein the processor generates the reply packet to initiate a direct connection to the newly created virtual machine subsequent to sending the reply packet.

10. The security gateway defined in claim 7 wherein the interface receives a packet from the newly created virtual machine to initiate a direct connection between the security gateway and the newly created virtual machine subsequent to interface sending the reply packet.

11. The security gateway defined in claim 7 wherein the destination address is for a location on the Internet, a domain name, or a broadcast address.

12. An article of manufacture having one or more non-transitory computer readable media storing instructions thereon which, when executed by a device in a network that is located between the network and one or more systems which have at least one or more virtual machines running thereon, causes the device to perform a method comprising:

monitoring, using an interface of the device, one or more packets being sent from the one or more virtual machines and a newly deployed virtual machine running on one of the one or more systems, wherein the newly deployed virtual machine provides an internet protocol (IP) address in a discovery packet, and wherein the newly deployed virtual machine comprises one of a dynamically created virtual machine that has acquired a dynamically created IP address or an existing virtual machine with a changed IP address;

in response to detection by the device of the newly deployed virtual machine based on receipt of a discovery packet sent by the newly deployed virtual machine in the one or more packets being monitored and the IP address in the discovery packet, intercepting the discovery packet at the device, wherein the discovery packet is sent from the newly deployed virtual machine to an address of a destination location on the network different from an address of the device;

determining, using a processor of the device, from the intercepted discovery packet from the newly deployed virtual machine, the address of the destination location and the IP address of the newly deployed virtual machine that sent the discovery packet; and sending, using the interface of the device, a reply packet to the newly deployed virtual machine, the reply packet generated by the device in response to the discovery packet using the IP address of the newly deployed virtual machine in the discovery packet identified in the intercepted discovery packet, the reply packet including an IP address of the device that enables communication between the newly deployed virtual machine and the destination location through the device, wherein a connection is initiated with the newly deployed virtual machine based on the reply packet.

13. The article of manufacture defined in claim 12 wherein the device comprises a security gateway.

14. The article of manufacture defined in claim 13 wherein the discovery packet is a DNS query or an HTTP request.

15. The article of manufacture defined in claim 13 wherein initiation of the connection further comprises:
subsequent to sending the reply packet, initiating a direct connection with the newly created virtual machine.

16. The article of manufacture defined in claim 13 wherein initiation of the connection further comprises:
subsequent to sending the reply packet, receiving a packet from the newly created virtual machine to initiate a direct connection with the device and the newly created virtual machine.

17. The article of manufacture defined in claim 13 wherein the destination address is for a location on the Internet, a domain name, or a broadcast address.

* * * * *

UNITED STATES PATENT AND TRADEMARK OFFICE
CERTIFICATE OF CORRECTION

PATENT NO. : 9,529,995 B2  
APPLICATION NO. : 13/291739  
DATED : December 27, 2016  
INVENTOR(S) : Shieh Page 1 of 1

It is certified that error appears in the above-identified patent and that said Letters Patent is hereby corrected as shown below:

On the Title Page

Item (75) Inventor, please delete the text "Choung-Yaw Michael Shieh" and insert the text --Choung-Yaw Shieh--

Signed and Sealed this
Twentieth Day of November, 2018

Andrei Iancu
*Director of the United States Patent and Trademark Office*